United States Patent
Esser et al.

(10) Patent No.: US 7,083,277 B2
(45) Date of Patent: Aug. 1, 2006

(54) PAIR OF SPECTACLE LENSES

(75) Inventors: Gregor Esser, Munich (DE); Helmut Altheimer, Baisweil-Lauchdorf (DE); Walter Haimerl, Munich (DE); Edda Wehner, Emmering (DE); Andrea Welk, Munich (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 11/149,301

(22) Filed: Jun. 10, 2005

(65) Prior Publication Data

US 2005/0280775 A1    Dec. 22, 2005

Related U.S. Application Data

(63) Continuation of application No. PCT/EP2003/014017, filed on Dec. 10, 2003.

(30) Foreign Application Priority Data

Dec. 12, 2002    (DE) ............................... 102 58 332

(51) Int. Cl.
    *G02C 7/06*    (2006.01)

(52) U.S. Cl. .................... 351/168; 351/169; 351/177
(58) Field of Classification Search ................ 351/168, 351/169
    See application file for complete search history.

(56) References Cited

U.S. PATENT DOCUMENTS

| | | | |
|---|---|---|---|
| 4,606,622 A | | 8/1986 | Fueter et al. |
| 5,485,228 A | * | 1/1996 | Roffman et al. ............. 351/161 |
| 5,530,491 A | | 6/1996 | Baude et al. |
| 5,574,518 A | | 11/1996 | Mercure |
| 5,710,615 A | | 1/1998 | Kitani |
| 5,790,226 A | * | 8/1998 | Pollak ......................... 351/54 |
| 5,812,238 A | | 9/1998 | Ahsbahs et al. |
| 6,478,422 B1 | * | 11/2002 | Hansen ....................... 351/172 |
| 6,554,859 B1 | * | 4/2003 | Lang et al. ................. 623/6.28 |
| 6,561,646 B1 | * | 5/2003 | Silliphant ..................... 351/44 |
| 2001/0033363 A1 | | 10/2001 | Chateau et al. |

\* cited by examiner

*Primary Examiner*—Jordan M. Schwartz
(74) *Attorney, Agent, or Firm*—Crowell & Moring LLP

(57) ABSTRACT

A pair of spectacle lenses in which one spectacle lens is designed for distance vision or near vision, and the second spectacle lens is designed for another object distance.

2 Claims, 5 Drawing Sheets

PAIR OF SPECTACLE LENSES

CROSS REFERENCE TO RELATED APPLICATIONS

This application is a continuation of international patent application no. PCT/EP2003/014017, filed Dec. 10, 2003, designating the United States of America, and published in German as WO 2004/53566 A1 on Jun. 24, 2004, the entire disclosure of which is incorporated herein by reference. Priority is claimed based on Federal Republic of Germany patent application no. DE 102 58 332.3, filed Dec. 12, 2002.

BACKGROUND OF THE INVENTION

The present invention relates to a pair of spectacle lenses. It is important in the case of progressive lenses, in particular, to achieve the best possible binocular vision, since the aberrations increase strongly at the periphery.

In prior art progressive lenses as exemplified by EP 944,375 from Essilor; WO 01/84213 from Rodenstock, and U.S. Pat. No. 4,606,622 from Zeiss, an attempt is made to achieve this by fashioning the aberrations at the periphery to be as equal as possible at the corresponding viewing points for the right-hand and left-hand spectacle lenses. The consequence of this is that the right eye and the left eye have the same aberrations when viewing an object.

Consequently, binocular parameters such as, for example, aniseikonia, differences in distortion, laterally disparate depth vision, etc. can be positively influenced.

By contrast, the present invention proceeds from a completely different starting point. Thus, it is known (compare Wörterbuch der Optometrie [Dictionary of Optometry], Helmut Goersch, Enke Verlag, p. 198) that the binocular visual acuity is generally greater than the maximum visual acuity of the individual eye:

$$Visus_{binocular} > \max(Visus_R, Visus_L).$$

SUMMARY OF THE INVENTION

The object of the invention is therefore to provide a pair of spectacle lenses in which the aberrations, and thus the visual acuities of the individual eyes at the corresponding viewing points, are not equal, but differ. The aim thereby is for the aberrations to be as slight as possible at many viewing points for at least one spectacle lens, and thus for the binocular visual acuity to be high at many viewing points. Thus, the binocular visual acuity is thereby preferred at the expense of the other binocular parameters.

This and other objects are achieved by providing a pair of spectacle lenses in which one spectacle lens is designed for distance vision or near vision, and the second spectacle lens is designed for another object distance, in order to obtain binocular visual fields that are as large as possible.

In one embodiment, both spectacle lenses are single-vision lenses, and one spectacle lens corresponds to the distance value and the second spectacle lens corresponds to the near value.

In another embodiment, one spectacle lens is a progressive lens and the second spectacle lens is a single-vision lens that is designed for a main viewing task.

In the case, in turn, of another embodiment, both spectacle lenses are progressive lenses, one spectacle lens being optimized for the distance field, and the other spectacle lens being optimized for the near field. The near value is decreased in the case of one lens, and the distance value is increased in the case of the other lens.

A further object of the invention is to provide a method for determining a pair of spectacle lenses in order to obtain a pair of spectacle lenses as described above.

This object is achieved by providing a method wherein one spectacle lens is designed for distance vision or near vision, and the second spectacle lens is designed for another object distance, said method comprising:
determining a main viewing task,
determining a lead eye, and
calculating a pair of spectacle lenses.

The main viewing task is first determined, followed by determination of the lead eye, and a pair of spectacle lenses are calculated thereafter.

BRIEF DESCRIPTION OF THE DRAWINGS

The invention will be described in further detail hereinafter with reference to illustrative preferred embodiments depicted in the accompanying drawing figures, which constitute a part of the disclosure of this application, and in which.

DETAILED DESCRIPTION OF PREFERRED EMBODIMENTS

Figure 1:
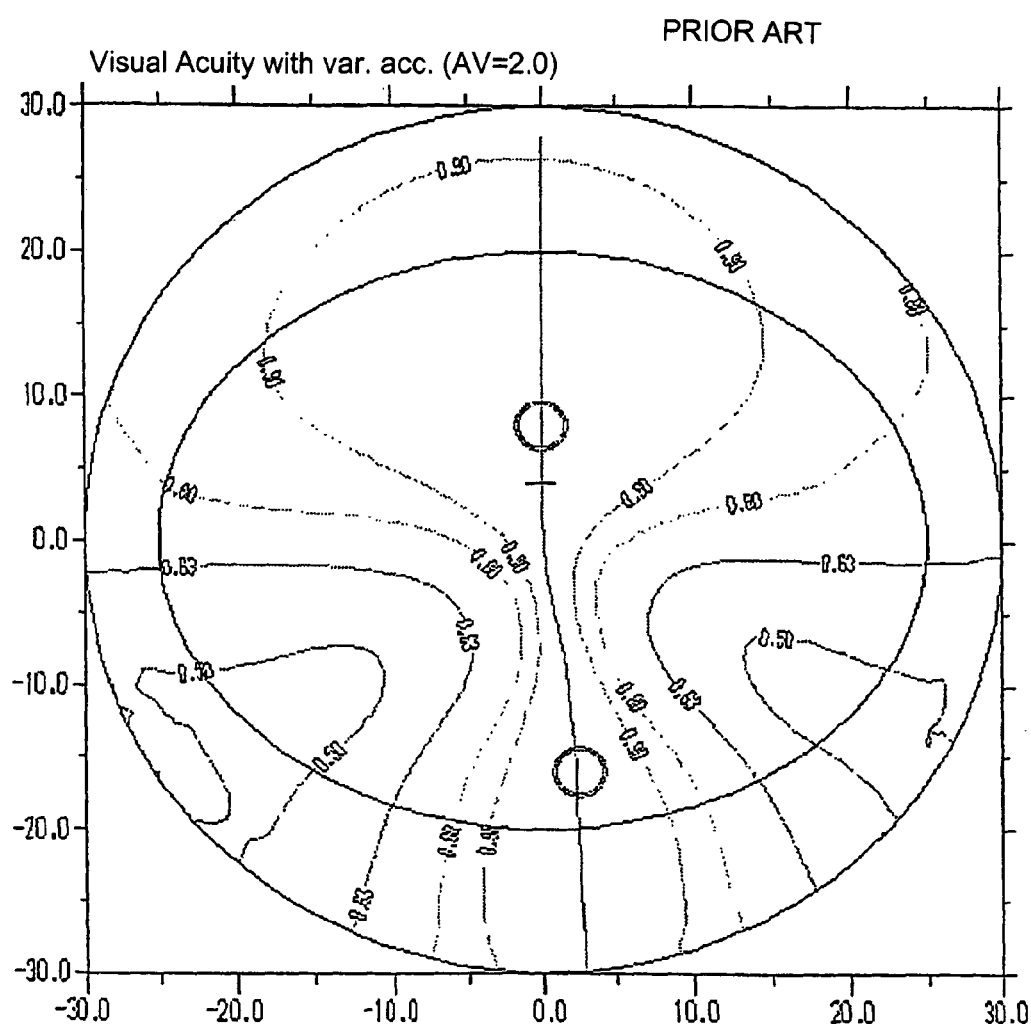
FIG. 1 shows a conventional progressive lens in the case of which the same progressive lens was used on the right and left.

As already mentioned, in order to determine a pair of spectacle lenses the main viewing task is first determined, then the lead eye is determined, and thereafter the pair of spectacle lenses are calculated. An example is set forth below:

The lead eye is on the right, the main viewing task is the distance field, and the prescription is R/L sph—4 dpt Add 2.0 dpt.

The result on the right is thus a single-vision lens having the action sph—4 dpt, and on the left a single-vision lens having sph—2 dpt. Such a pair of spectacle lenses certainly do not have optimum binocular properties, but the binocular visual acuity is very high at all viewing points, and the binocular fields of view are therefore very large. Of course, this can also be applied to prescriptions differing for right and left, or to viewing tasks deviating from distance field or near field, such as in the case of spectacles for computer stations or workstations, for example.

The binocular fields of view are not limited in the case of such an embodiment with two single-vision lenses, since the visual acuity is always optimum (either for the distance field or near field) in the case of one spectacle lens in each case. However, the remaining binocular imaging parameters are then more strongly restricted.

It is known that the aberrations are disturbing at the periphery in the case of progressive lenses. This can be rectified with the aid of a further embodiment according to the invention.

Since the binocular vision is very greatly limited in the case of the design of two single-vision spectacle lenses, a progressive lens is therefore selected on one side, and a single-vision lens on the other side. The prescription is the same as was specified above. Consequently, the selection would be: R progressive lens sph—4 dpt Add 2.0; L single-vision lens sph—4 dpt. Thus, the binocular field of view is unlimited in the distance field, and yet it is still possible, for example, to read a menu with the near zone and intermediate zone. Thus, if the aim is to make an unlimited distance field of view available, and for reading tasks to be undertaken only briefly, such a pair of spectacle lenses are found to be the ideal solution.

Of course, all conceivable combinations are also possible here. If the main viewing task is in the near zone, a near lens is selected on the left side or, should it be desired to accord yet more importance to the main viewing task, it is also possible to provide the lead eye with a single-vision lens, and the other with a progressive lens.

A further possibility is to supply two progressive lenses. In this case, one spectacle lens is optimized for the distance field, and one spectacle lens is optimized for the near field. The result is thus a large distance zone in the case of one progressive lens, and a large near zone in the case of the other. Consequently, the binocular visual fields are then very large both in the distance field and in the near field.

This can be further amplified by decreasing the near value (less plus) in the case of one progressive lens and/or increasing the distance value, that is to say varying it in the plus direction, in the case of the other progressive lens. The progression channel is thereby expanded both in monocular and in binocular terms.

Figure 2:
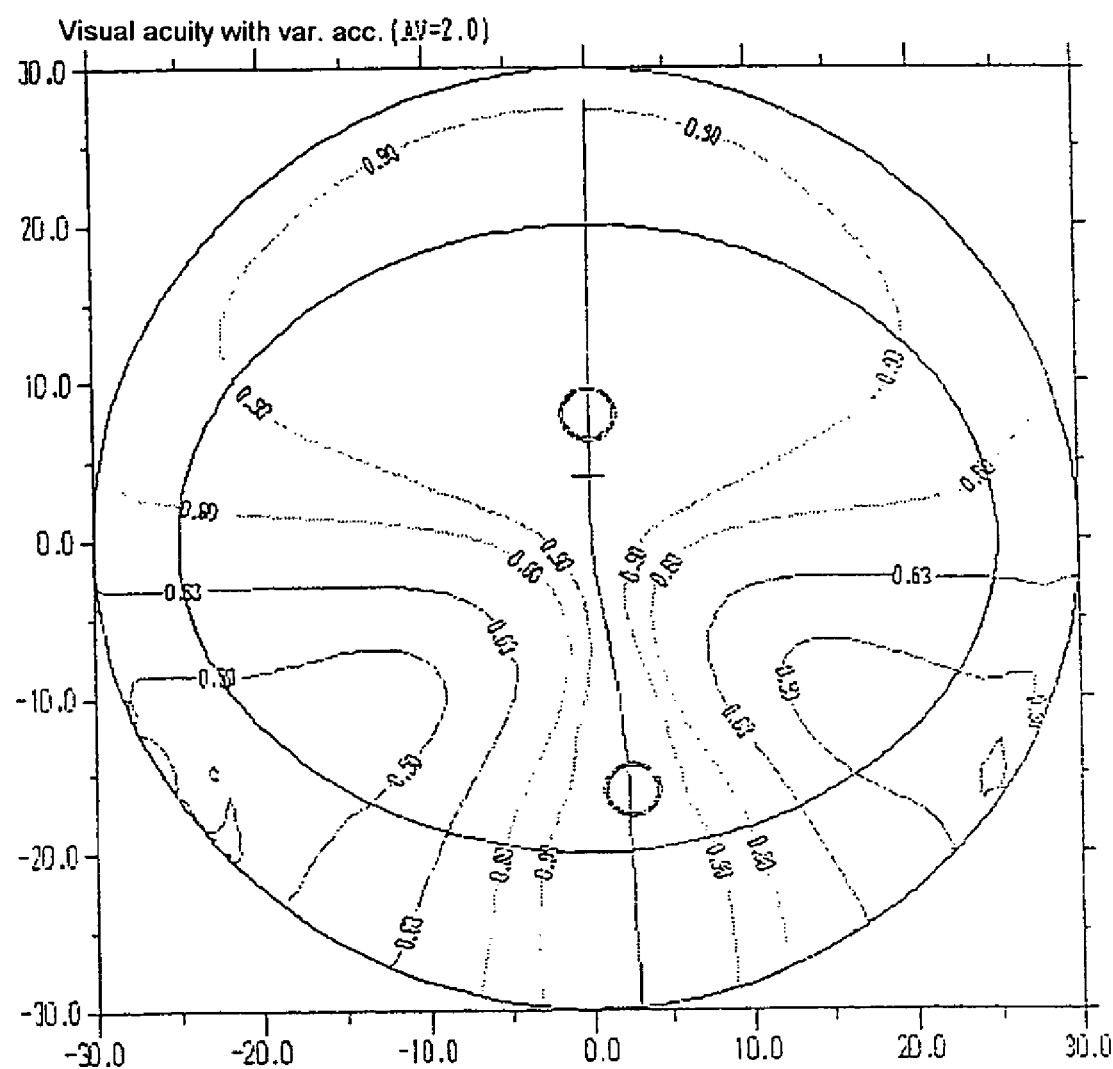
FIG. 2 shows a progressive lens according to the invention with R sph—4.0 dpt Add 1.5 dpt.
Figure 3:
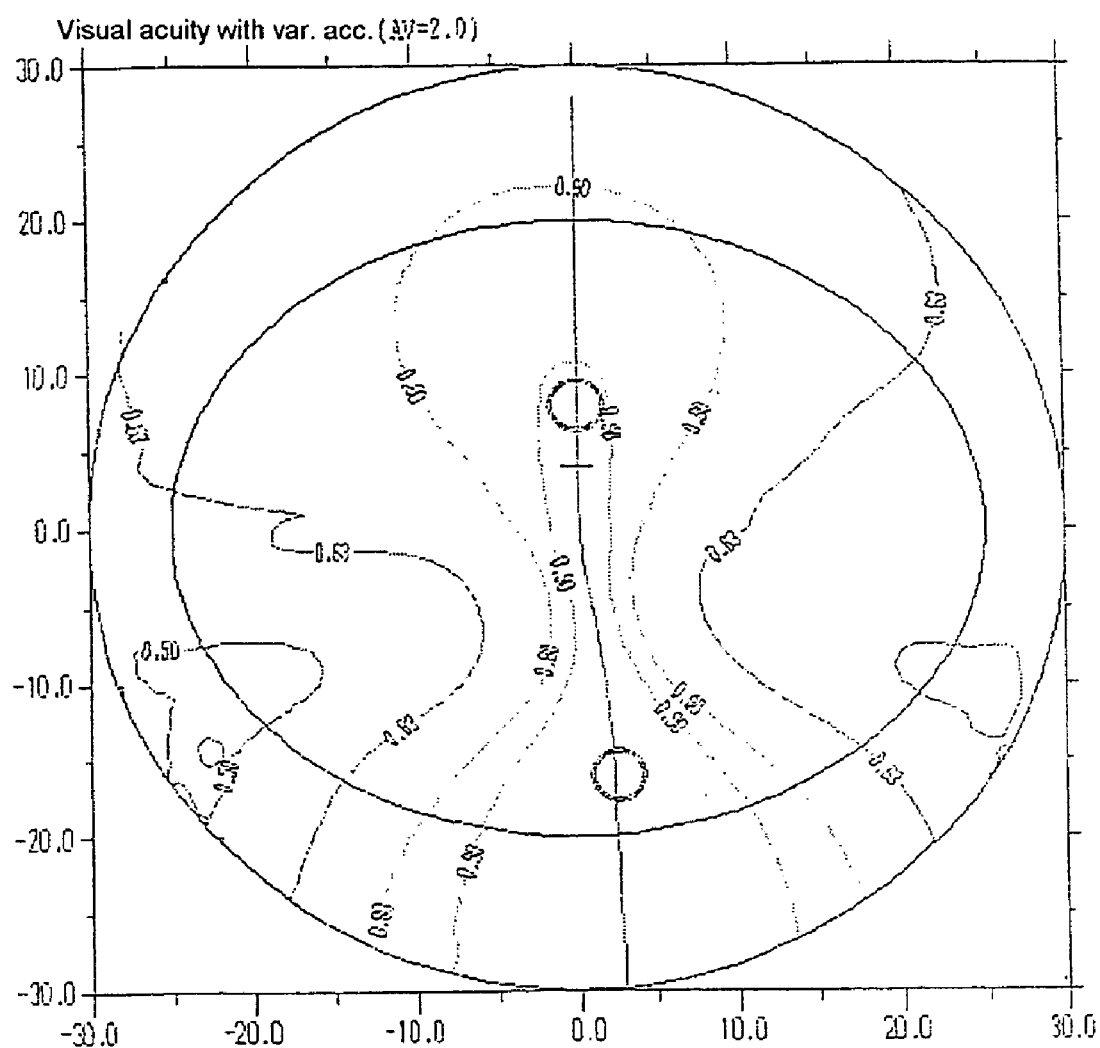
FIG. 3 shows a progressive lens according to the invention with L sph—3.5 dpt Add 1.5 dpt.
Figure 4:
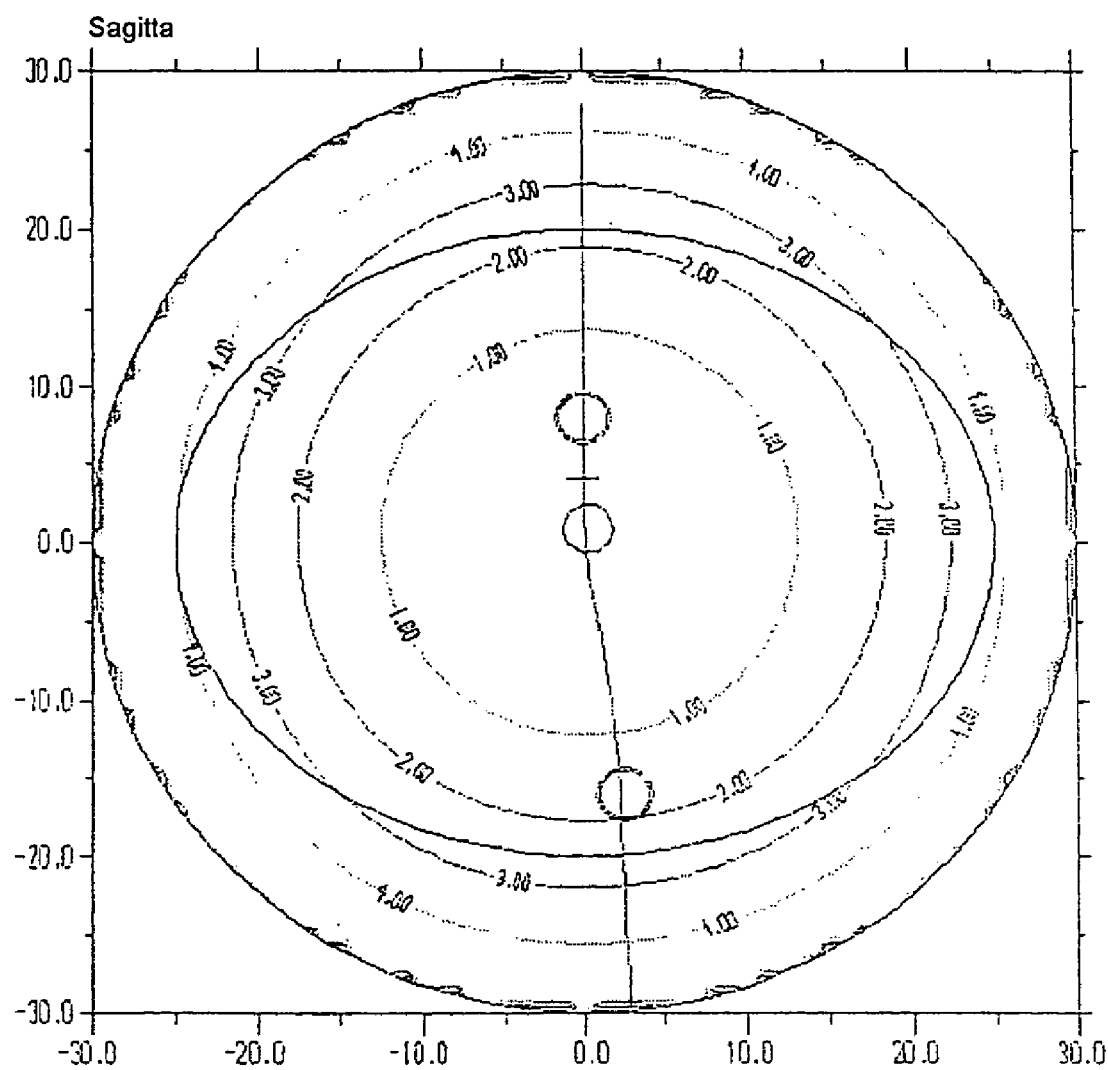
FIG. 4 shows the sagittas of the right-hand lens of FIG. 2.
Figure 5:
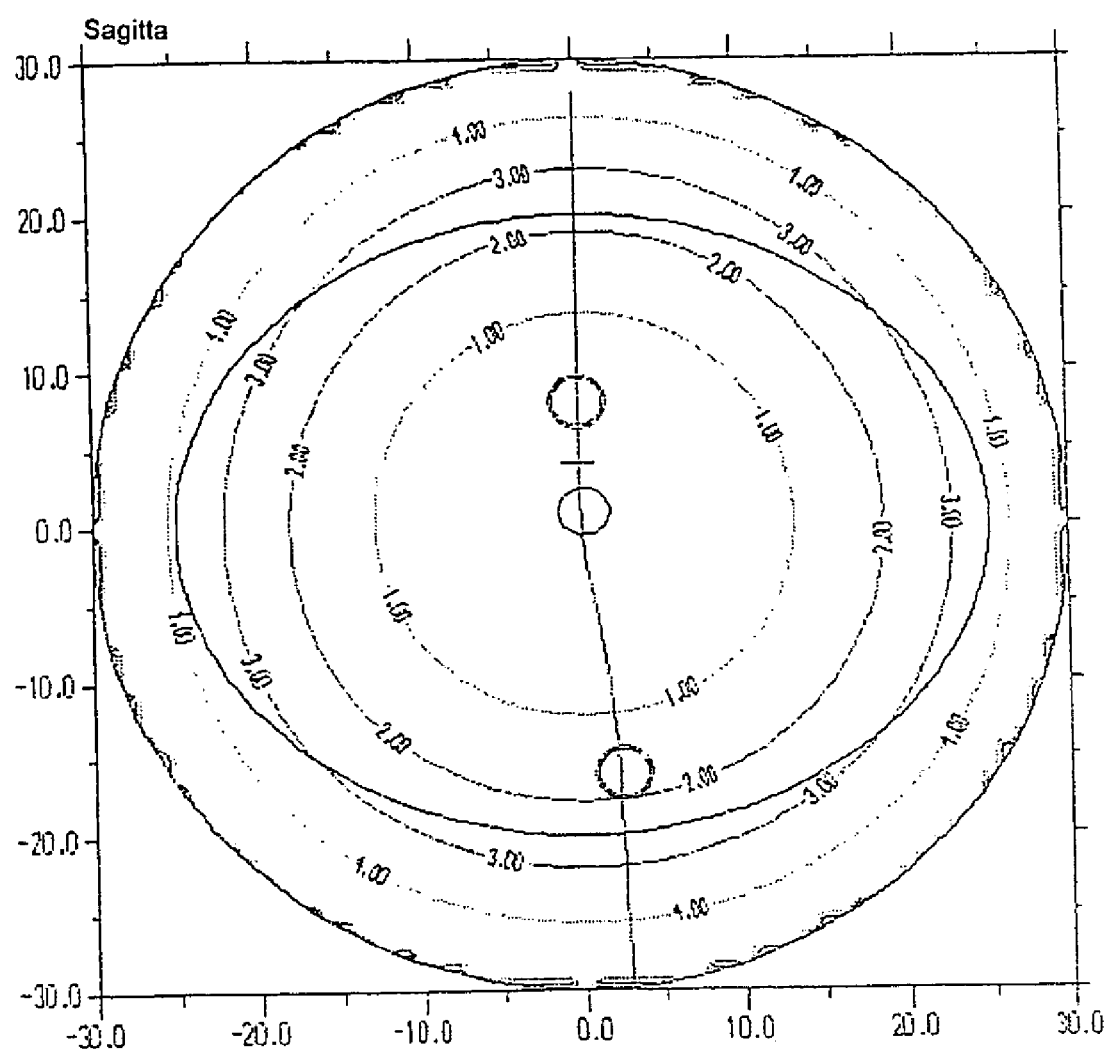
FIG. 5 shows the sagittas of the left-hand lens of FIG. 3.

This example is described in FIGS. 2 and 3. The following prescription is used:

R/Lsph—4.0 dpt Add 2.0 dpt, lead eye on the right, main viewing task in the distance field.

A progressive lens with an optimum distance zone and an action sph—4.0 Add 1.5 is calculated for the right-hand spectacle lens, and a progressive lens with an optimum near zone and an action sph—3.5 Add 1.5 is calculated for the left-hand spectacle lens. This results in a pair of spectacle lenses in which the binocular visual fields are markedly enlarged, both in the distance field as well as in the near field and in the progression zone. The increase and/or the decrease in the distance zone and near zone (0.5 dpt in the example), and the preference in the case of the calculation of distance field and/or near field, can be freely selected as a function of the size of the fields of view or of the binocular vision. The increase or the decrease need not necessarily be by the same amount, in this case. Table 1 illustrates the widths of the field of view (visual acuity>0.9).

TABLE 1 widths of the field of view (visual acuity > 0.9)

|  | Conventional progressive lens | Invention R | Invention L | Invention binocular |
| --- | --- | --- | --- | --- |
| Distance field (distance reference point) | 26.8 mm | 37 mm | 4.3 mm | 37 mm |
| Progression channel (narrowest point) | 2.2 mm | 2.4 mm | 2.4 mm | 2.4 mm |
| Near field (near reference point) | 9.5 mm | 7.3 mm | 13.4 mm | 13.4 mm |

In the case of a pair of spectacle lenses according to the invention, the visual field is enlarged by 38% in the distance field, by 9% in the intermediate zone, and by 41% in the near zone.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A pair of spectacle lenses that comprise a left spectacle lens for viewing by a left eye of a user and a right spectacle lens for viewing by a right eye of the user, wherein one of said left or right spectacle lenses is designed for at least distance vision or near vision, and the other of the left and right spectacle lenses is designed for viewing another object distance, one spectacle lens being a progressive lens and the second spectacle lens being a single-vision lens that is designed for a main viewing task.

2. A method for determining a pair of spectacle lenses that comprise a left spectacle lens for viewing by a left eye of a user and a right spectacle lens for viewing by a right eye of the user, wherein one of said left or right spectacle lenses is designed for at least distance vision or near vision, and the other of the left and right spectacle lenses is designed for viewing another object distance, one spectacle lens being a progressive lens and the second spectacle lens being a single-vision lens that is designed for a main viewing task, said method comprising:
   determining a main viewing task,
   determining a lead eye, and
   calculating a pair of spectacle lenses.

* * * * *